United States Patent
Kent et al.

(10) Patent No.: US 6,492,979 B1
(45) Date of Patent: Dec. 10, 2002

(54) DUAL SENSOR TOUCHSCREEN UTILIZING PROJECTIVE-CAPACITIVE AND FORCE TOUCH SENSORS

(75) Inventors: Joel Kent, Fremont, CA (US); Geoffrey D. Wilson, Oxnard, CA (US)

(73) Assignee: Elo TouchSystems, Inc., Fremont, CA (US)

( * ) Notice: Subject to any disclaimer, the term of this patent is extended or adjusted under 35 U.S.C. 154(b) by 0 days.

(21) Appl. No.: 09/391,352

(22) Filed: Sep. 7, 1999

(51) Int. Cl.[7] .................................................. G09G 5/00
(52) U.S. Cl. ....................... 345/173; 345/174; 345/179; 345/156; 345/178; 345/175; 178/18.9; 178/18.09; 178/18.05; 178/18.03; 178/18.01
(58) Field of Search .................................. 345/173, 179, 345/156, 174, 178; 178/18.03, 18.05, 18.01, 18.9, 18.09; 338/68

(56) References Cited

U.S. PATENT DOCUMENTS

| | | |
|---|---|---|
| 4,103,252 A | 7/1978 | Bobick |
| 4,145,748 A | 3/1979 | Eichelberger et al. |
| 4,264,903 A | 4/1981 | Bigelow |
| 4,644,100 A | 2/1987 | Brenner et al. |
| 4,686,332 A | 8/1987 | Greanias et al. |
| 4,700,176 A | 10/1987 | Adler |
| 4,778,951 A | 10/1988 | Pepper, Jr. et al. |
| RE33,151 E | 1/1990 | Adler |
| 4,924,222 A | 5/1990 | Antikidis et al. |
| 4,954,823 A | 9/1990 | Binstead |
| 5,117,071 A | 5/1992 | Greenias et al. |
| 5,231,381 A | 7/1993 | Duwaer |
| 5,270,711 A | 12/1993 | Knapp |
| 5,332,238 A | 7/1994 | Borucki |

(List continued on next page.)

FOREIGN PATENT DOCUMENTS

| | | | |
|---|---|---|---|
| EP | 0 372 964 | 6/1990 | ............ G06K/11/08 |
| EP | 421 025 A1 * | 4/1991 | |
| EP | 0 727 875 A1 | 8/1996 | |
| GB | 2 295 017 A | 5/1996 | |
| WO | WO 88/05577 | 7/1988 | |
| WO | WO 95/27334 | 10/1995 | |
| WO | WO 96/15464 | 5/1996 | |

OTHER PUBLICATIONS

International Search Report for International Application No. PCT/US00/29602 dated Nov. 5, 2001.*

Primary Examiner—Richard Hjerpe
Assistant Examiner—Ali Zamani (57) ABSTRACT

A method and apparatus for discriminating against false touches in a touchscreen system is provided. The system is designed to confirm a touch registered by one touch sensor with another touch sensor, preferably of a different sensor type, prior to acting upon the touch (i.e., sending touch coordinates to the operating system). If the touch registered by the first touch sensor is not confirmed by the second touch sensor, the touch is invalidated. Thus the strengths of one type of sensor are used to overcome the deficiencies of another type of sensor. This system is particularly well suited to meet the demands of an outdoor or semi-outdoor application. In one embodiment, one or more force sensors are used as the false touch sensor and a projective-capacitive sensor is used as the position coordinate determining sensor. In another embodiment, a projective-capacitive sensor is used as the false touch sensor. As the projective-capacitive sensor is only being used to provide touch confirmation, in this embodiment very few electrodes are required as well as minimal channel electronics. In another embodiment, both touch sensors are capable of providing accurate touch coordinates. In this configuration the system preferably determines which of the sensors is more likely to provide accurate information based on the circumstances.

26 Claims, 7 Drawing Sheets

U.S. PATENT DOCUMENTS

| | | |
|---|---|---|
| 5,510,813 A | 4/1996 | Makinwa |
| 5,543,589 A | 8/1996 | Buchana et al. |
| 5,650,597 A | 7/1997 | Redmayne |
| 5,670,755 A | 9/1997 | Kwon |
| 5,708,461 A | 1/1998 | Kent |
| 5,742,119 A | 4/1998 | Aben et al. |
| 5,777,607 A | 7/1998 | Koolen |
| 5,790,106 A | 8/1998 | Hirano et al. |
| 5,801,682 A * | 9/1998 | Coni et al. .................. 345/174 |
| 5,854,450 A | 12/1998 | Kent |
| 5,880,712 A | 3/1999 | Goldman .................... 345/168 |

* cited by examiner

DUAL SENSOR TOUCHSCREEN UTILIZING PROJECTIVE-CAPACITIVE AND FORCE TOUCH SENSORS

This application is filed simultaneously with U.S. patent application Ser. No. 09/390,207 entitled TOUCH CONFIRMING TOUCHSCREEN UTILIZING PLURAL TOUCH SENSORS, the disclosure of which is incorporated herein for all purposes.

TECHNICAL FIELD OF THE INVENTION

The present invention relates generally to touchscreens and, more particularly, to a method and apparatus for discriminating between a false touch event and a true touch on a touchscreen.

BACKGROUND OF THE INVENTION

Touchscreens are used in conjunction with a variety of display types, including cathode ray tubes (i.e., CRTs) and liquid crystal display screens (i.e., LCD screens), as a means of inputting information into a data processing system. When placed over a display or integrated into a display, the touchscreen allows a user to select a displayed icon or element by touching the screen in a location corresponding to the desired icon or element. Touchscreens have become common place in a variety of different applications including, for example, point-of-sale systems, information kiosks, automated teller machines (i.e., ATMs), data entry systems, etc.

A variety of touchscreen types have been developed. Unfortunately each type of touchscreen has at least one weakness limiting its usefulness in at least some applications. For example, the cover sheet in a resistive touchscreen is susceptible to damage such as surface scratches or cuts due to malicious vandalism. Even repeated screen compressions may eventually damage a resistive touchscreen. This type of touchscreen is also susceptible to environmental damage, for example moisture entering the display. A second type of touchscreen, thin dielectric layer capacitive touchscreens, have problems with gloved hands. Thick dielectric layer capacitive touchscreens, also referred to as projective capacitive touchscreens, have problems with non-tactile feel and palm rejection. A third type of touchscreen utilizing surface acoustic waves is susceptible to the accumulation of contaminants, e.g., raindrops, on the surface of the sensor. Contamination can also interfere with the operation of infrared touchscreens. Also infrared touchscreens require special effort to avoid signal problems due to direct sunlight. A fifth type of touchscreen using force sensors is susceptible to shock and vibration.

Various systems have been designed that utilize two different touchscreen technologies for a variety of purposes, primarily as a means of accommodating different touch mechanisms, e.g., a finger and a stylus, for data entry.

U.S. Pat. No. 5,231,381 discloses a multi-purpose data input device utilizing an integrated touchscreen and a digitizing tablet. The touchscreen detects the presence and location of a passive input (e.g., finger touch) through any of a variety of techniques including surface acoustic wave, force, capacitive, or optical touch sensors. The digitizing tablet employs an active stylus mechanism to stimulate a capacitive, inductive, or surface acoustic wave sensor.

U.S. Pat. No. 5,510,813 discloses a touch panel that measures both touch position and touch force. The touch panel uses a resistive, conductive layer and determines touch position by monitoring the current pattern. The force of the touch is determined by monitoring a capacitance value between the touch panel and a second conductive panel that extends substantially parallel to the touch panel. In response to a touch, the system processes both the detected position and the detected force of the touch.

U.S. Pat. No. 5,543,589 discloses a dual sensor touchscreen in which each sensor determines touch position, but with a different resolution. The two sensors are sandwiched together to form a single sensor, thus allowing a single touch by a finger, stylus, etc. to be detected by both sensors. In use, the wide conductors of the low resolution sensor are first scanned in order to determine touch position to within a rectangular area the size of one wide conductor. To determine the touch location with the higher resolution sensor, only the narrow conductors corresponding to the rectangular area of touch determined with the low resolution sensor must be scanned. Thus the system disclosed is intended to reduce the number of scan drivers and receivers required, thus lowering cost as well as speeding up the scanning process.

U.S. Pat. No. 5,670,755 discloses a touch panel that can be used in either of two modes. In one mode, the touch panel operates like a conventional touchscreen, allowing a user to input information by touching the screen with a finger, pen, or other touching medium. In this mode two resistive layers applied to the panel come into contact at the point of touch. The determination of the contact location is based on resistance ratios. In a second mode, the touch panel functions as a digitizer using a specially designed stylus. Capacitance coupling at the contact point of the stylus to the panel is used in determining the contact point.

U.S. Pat. No. 5,777,607 discloses a system that senses finger touch capacitively and stylus touch resistively. In either touch mode the disclosed system is able to determine the x- and y-coordinates of the touch on the touchscreen using a single resistive layer. In the preferred embodiment, the finger detection mode is disabled when the system detects the stylus is in use, thus preventing the inadvertent input of data through capacitive coupling with the user's hand.

U.S. Pat. No. 5,801,682 discloses a dual sensor touchscreen in which the variations in coordinate data from a capacitive sensor are compensated for by the use of strain gauges mounted at the corners of the sensor. Variations in the capacitive sensor data may result from changes in signal path, for example, due to the user wearing gloves.

What is needed in the art is a method and apparatus for discriminating against false touches of the sort that may result from external stimuli or for confirming the presence of touch. The present invention provides such a method and apparatus, a method and apparatus that is particularly well suited for outdoor applications.

SUMMARY OF THE INVENTION

The present invention provides a method and apparatus for discriminating against false touches in a touchscreen system. The system utilizes multiple touchscreen sensors of differing types to validate a touch on a touchscreen. Thus the invention utilizes the strengths of specific sensor types to overcome the deficiencies of other sensor types, particularly with respect to the demands of outdoor and semi-outdoor applications where supervision is limited and rain drops and/or other contaminants may be present.

The basis of the invention lies in the ability to confirm a touch registered by one touch sensor with another touch sensor. If the touch is confirmed, the touch can be acted upon, for example by sending touch coordinates to the operating system. If, on the other hand, the touch is not confirmed, the touch is invalidated. The system can be designed such that there is a primary touch sensor that determines the touch coordinates and a secondary sensor that validates the presence of a touch, by either a discrete signal or by generating a second set of touch coordinates for comparison purposes. Furthermore, the touch coordinates can either be determined before or after the initial touch is confirmed. The combination of force and projective capacitive sensor systems is particularly well suited to meet the needs of demanding outdoor and semi-outdoor touch applications.

In one embodiment of the invention, projective-capacitive sensors are used as the primary sensor and one or more force sensors are used to obtain touch validation. In this embodiment the force sensor is used to determine when an object makes contact with the touch surface. Preferably the system is set-up to require that a certain pressure must be applied to the touchscreen in order to register a touch. Once the pressure on the touchscreen exceeds a predetermined threshold, the projective-capacitive sensor is queried to determine if it also detects a touch. If the projective-capacitive sensor does not detect a touch, the touch is invalidated and the system is placed back into a stand-by mode. If the projective-capacitive sensor does detect a touch, then position coordinates are determined. Additionally, in the preferred embodiment an untouch threshold is set. This threshold can be, for example, equal to a percentage of the projective-capacitive signal amplitude when the touch was first detected by the force sensor.

In another embodiment of the invention, multiple force sensors are used as the primary sensor to accurately determine touch position coordinates while a projective-capacitive sensor is used as the secondary sensor to validate a touch detected by the primary sensor. In this embodiment, since the projective-capacitive sensor is only used for touch confirmation, it can utilize very few electrodes, thereby minimizing both touchscreen fabrication complexity and the number of required electronic channels. In this embodiment after a touch is detected by the force sensors, the projective-capacitive sensor is queried to determine whether the touch was due to a conductive and grounded object. If the touch is validated, touch position coordinates are generated by the primary sensor and the system is returned to stand-by mode. In its simplest configuration, if the touch is invalidated the system is simply returned to stand-by mode without determining touch coordinates or reporting any coordinates to the operating system. In an alternate configuration, if the touch is invalidated, the pressure threshold of the force sensors is adjusted to minimize further false touches.

In another embodiment of the invention, projective-capacitive and force sensors are utilized, both of which are capable of providing accurate touch position coordinates. In this embodiment the system is designed to determine which sensor is most likely to provide accurate position coordinates for a given set of conditions.

A further understanding of the nature and advantages of the present invention may be realized by reference to the remaining portions of the specification and the drawings.

DESCRIPTION OF THE SPECIFIC EMBODIMENTS

Figure 1:
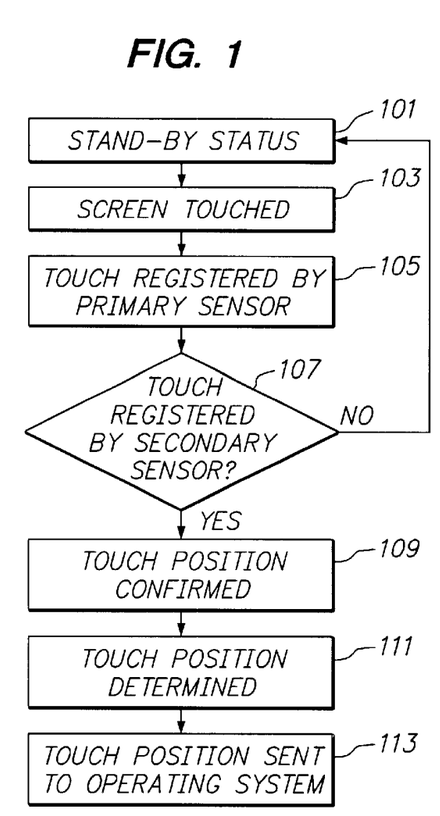
FIG. 1 is a flow chart illustrating the basic methodology of the present invention.

FIG. 1 is a flow chart illustrating the preferred operation of the present invention. At step 101, the touchscreen is in a pre-touch, stand-by status. The screen then receives a touch (step 103), for example via a finger, perhaps gloved. The primary touch sensor then registers a touch (step 105). Prior to the primary touch sensor determining the coordinates of the touch or sending any information to the operating system (e.g., touch position, touch mode, etc.), a secondary sensor confirms that the touch received by the primary sensor is a valid touch (step 107). If the secondary sensor confirms that the touch is valid (step 109), the touch position coordinates are determined (step 111). Depending upon the desired configuration, the coordinates of the touch position can be determined by either the primary sensor or the secondary sensor. The touch controller then sends the touch information (e.g., touch position coordinates) to the operating system (step 113). If the secondary sensor does not confirm that a valid touch was received by the primary sensor, no touch information is sent to the operating system and the touch sensor is placed back into stand-by status 101. The benefit of this embodiment is that time is not spent on determining invalid touch positions, thus enabling the system to quickly confirm that a valid touch has been received and if the touch is invalidated, to quickly return to stand-by status 101.

Figure 2:
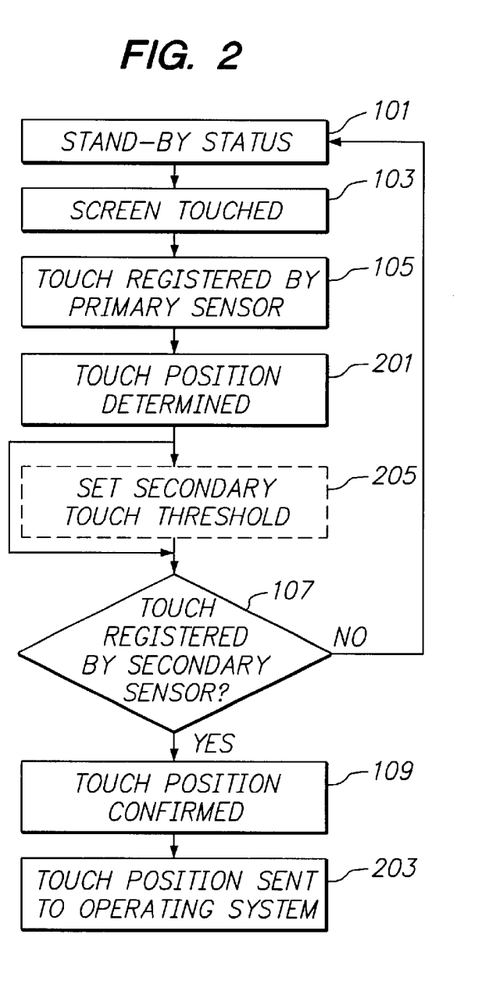
FIG. 2 is a flow chart illustrating an alternate methodology of the present invention.

In a slight modification of the system illustrated in FIG. 2, after the primary sensor registers a touch (step 105), it determines the position of the touch (step 201). After determining touch position, the system can simply query the secondary sensor to determine it has also registered a touch (step 107) and if it has, confirm the touch (step 109) and send the position coordinates to the operating system (step 203). Alternately, after the touch position has been determined (step 201), a coordinate dependent touch threshold is set for the secondary sensor (step 205), thus accounting for coordinate dependent touch sensitivities.

In the preferred embodiment of the invention, one of the sensors, preferably the secondary sensor, only determines whether or not a touch has been received. Since this sensor does not determine absolute touch position, it can be an inexpensive sensor. Alternately, this sensor can be designed to determine approximate touch position. For example, this sensor can be designed to determine what quadrant of the screen has been touched. In a third alternative this sensor can be designed to determine the actual coordinates of the touch position, thus providing system redundancy.

Preferably one of the sensors is a projective-capacitive sensor and the other is a force sensor. The system can be designed such that either of these sensors acts as the primary or touch position coordinate determining sensor while the other sensor acts simply as the validation sensor. In at least one embodiment of the invention, both sensors accurately determine the touch coordinates thus providing redundancy as well as a more sophisticated method of validating touch. Alternatively, one of the sensors can accurately determine the touch coordinates while the second sensor approximates the touch coordinates (e.g., to within a touchscreen quadrant).

Figure 3:
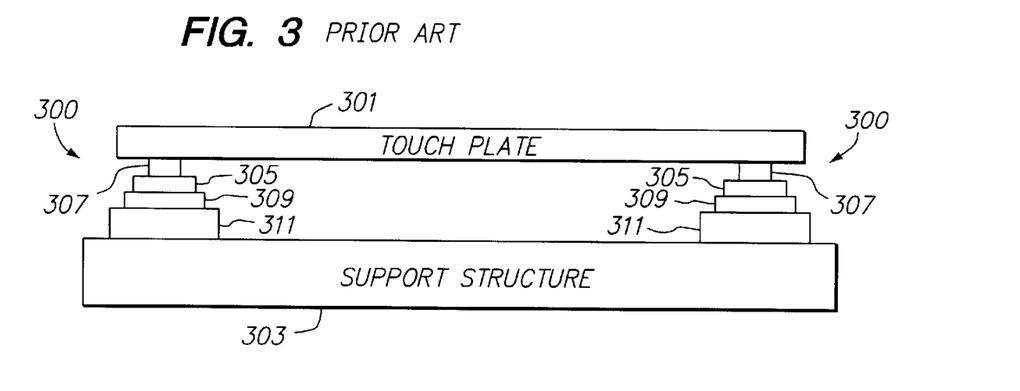
FIG. 3 is an illustration of a force sensor.

The design and use of force sensors in a touchscreen are well known by those of skill in the art and therefore will not be discussed in detail in the present specification. Force sensors are typified by temperature compensated strain gauges such as those disclosed in U.S. Pat. No. 5,742,222. Force sensors can also be based on peizo systems, such as those disclosed in U.S. Pat. Nos. 4,355,202 and 4,675,569 and European Patent Application No. EP 0 754 936. Preferably the present invention employs a pressure sensitive force sensor such as that illustrated in UK Patent Application Nos. GB 2 310 288 A, GB 2 321 707 A, and GB 2 326 719. FIG. 3, based on FIG. 5a of UK Patent Application No. GB 2 321 707 A, illustrates two such force sensors 300.

As shown, piezo-resistive force sensors 300 may be placed between one or more corners of a touch plate 301 and a support structure 303. Each force sensor 300 is comprised of a piezo-resistive material 305, the resistance of which changes as it is compressed. A top electrode 307 and a bottom electrode 309 permit electronic measurement of the resistance of piezo-resistive material 305. A sensor substrate 311 is provided to assure a mechanically robust force sensor construction. Insulating layers (not shown) may be added to provide electrical isolation as needed. In order to easily measure small percentage changes in resistance, the read-out electronics typically places force sensors 300 within a Wheatstone bridge.

The type of force sensors illustrated in FIG. 3 offer a number of advantages. First, the design supports an environmentally rugged construction that is immune to ambient temperature and humidity variations. Second, they directly measure compressive force. Third, because they can withstand very large bias compressions, they can be mechanically integrated as a simple washer in bolted assemblies.

Figure 4:
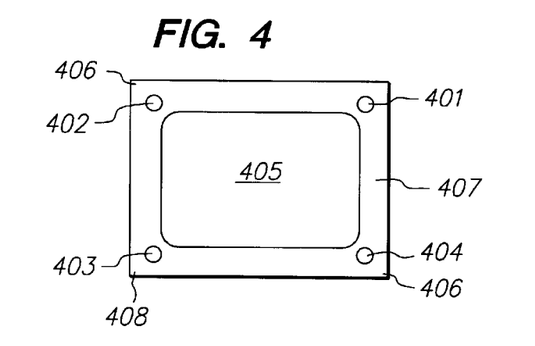
FIG. 4 is an illustration of one or more force sensors applied to a touchscreen.

The force sensors can be coupled to the touchscreen in either an overlay or non-overlay configuration and can utilize one or multiple sensors, depending upon whether the force sensor(s) is to supply touch validation or touch coordinates. In the simplest configuration, as shown in FIG. 4, a single force sensor 401 is located on a touchscreen 405. In the case of a single force sensor, low-stiffness supports at corners 406 and high-stiffness supports at corner 408 may be used to avoid zones of limited or no touch sensitivity. Preferably sensor 401 is located just outside of the viewing region of screen 405 and underneath a touchscreen cowling 407. Alternately, four force sensors 401-404 may be used, one located at each corner of touchscreen 405 to provide touch coordinates in a manner similar to that disclosed in U.S. Pat. No. 5,708,460.

It should be understood that a single force sensor 401 typically has a touch sensitivity that is dependent upon the location of the touch position. This sensitivity also depends upon the manner in which touchscreen 405 is mounted (e.g., rigid mounts versus soft mounts). Therefore if a single force sensor is to be used to supply touch validation, preferably the touch threshold of the force sensor is set on the basis of the touch position as determined by the projective capacitive sensor described below.

Figure 5:
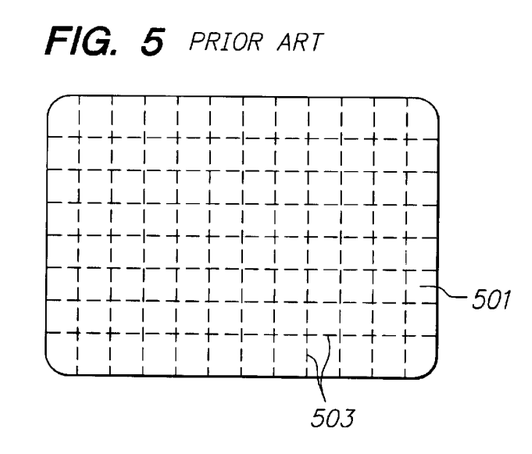
FIG. 5 is an illustration of a projective-capacitive touch sensor.
Figure 6:
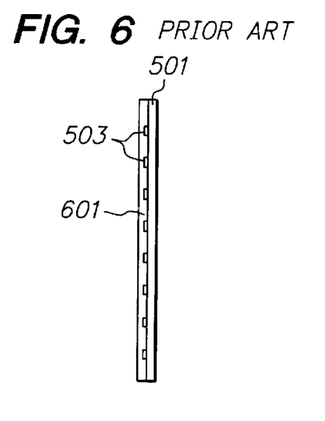
FIG. 6 is a cross-sectional view of the projective-capacitive touch sensor shown in FIG. 5.

The other sensor used in the preferred embodiment of the invention is a projective-capacitive sensor. FIGS. 5 and 6 provide front and cross-sectional views, respectively, of a projective-capacitive touch sensor, such as that disclosed in U.S. Pat. No. 5,844,506, the disclosure of which is incorporated herein for all purposes. In this configuration, deposited on substrate 501 is a pattern of electrodes 503, formed using fine wire electrodes, patterned resistive coatings, or other standard electrode designs. A protective overlay 601 prevents electrodes 503 from being damaged during use. As previously noted, projective-capacitive sensors 503 can be used either to provide the absolute touch position or simply to provide touch confirmation. Typically the spacing of the electrodes is given by the application, i.e., fine spacing for absolute position and course spacing for simple touch confirmation.

Projective-capacitive touchscreens, such as that shown above and those disclosed in U.S. Pat. Nos. 5,650,597 and 4,954,823 and PCT patent applications WO 95/27334 and 96/15464, the disclosures of which are incorporated herein for all purposes, monitor the change in touchscreen capacitance. Unlike a thin dielectric layer capacitive sensor, however, the capacitance of a projective-capacitive sensor is changed not only by touching the sensor with a grounded object, but also by simply bringing a grounded object into close proximity to the sensor. Thus the principal difficulty with this type of touchscreen is due to the various sizes of the grounded objects that can be used with the screen. For example, a small finger (e.g., a child's finger) will produce a substantially smaller signal than a large finger. Similarly, a person wearing gloves, as may be expected in some outdoor applications, will produce a significantly smaller signal than an ungloved hand. Another problem can result by the user simply getting too close to a portion of the screen, for example by leaning a hand against a surface that is in close proximity to the screen. Therefore a simple signal-level threshold system is not sufficient for determining the actual point of contact with a projective-capacitive sensor since, depending on the threshold, it may indicate a touch prior to the occurrence of the actual touch (e.g., large user hand with a touchscreen that has been set to recognize a child's fingers) or completely disregard a touch (e.g., disregard a child's finger because the screen is set-up for an adult finger).

In contrast to touchscreens based on projective-capacitive sensors, touchscreens utilizing force sensors do not have recognition problems with fingers of varying size. Nor do force sensors have difficulty in recognizing gloved hands, styluses, pens, etc. Force sensor touchscreens do, however, suffer from false signals caused by mechanical noise. For example, vibrations to the touchscreen can cause vibrations in the reference mass, thus generating extraneous background signals. Additionally, the extraneous background signals may cause the system to be-unable to recognize a valid touch.

In outdoor applications, force sensor based touchscreens can experience touch position errors due to the wind. For example, if a wind is blowing parallel to the touchscreen, a person standing in front of the touchscreen will cause an asymmetry in the pressure applied to the left and right-hand portions of the screen. Due to this pressure imbalance, the touchscreen force sensors will erroneously identify the coordinates of a touch. The amount of positional error is subject to the degree of pressure asymmetry applied to the touchscreen by the wind. This asymmetry is dependent upon the wind speed, the angle between the wind and the screen parallel, the degree to which the air flow is modified by the obstacle (i.e., the user), the size of the screen, and the amount of force applied by the user's touch.

Another problem with force sensors is associated with attempting to achieve a drag and untouch functionality. In order to achieve this functionality, the force sensor signals must be processed well into the sub-Hertz range. Unfortunately some types of force sensors (e.g., piezoelectric sensors) generate signals that are essentially the time derivatives of the applied force, thus making sub-Hertz information problematic. Even force sensors that generate signals that are proportional to the applied force may have problems processing sub-Hertz information due to mechanical noise.

Figure 7:
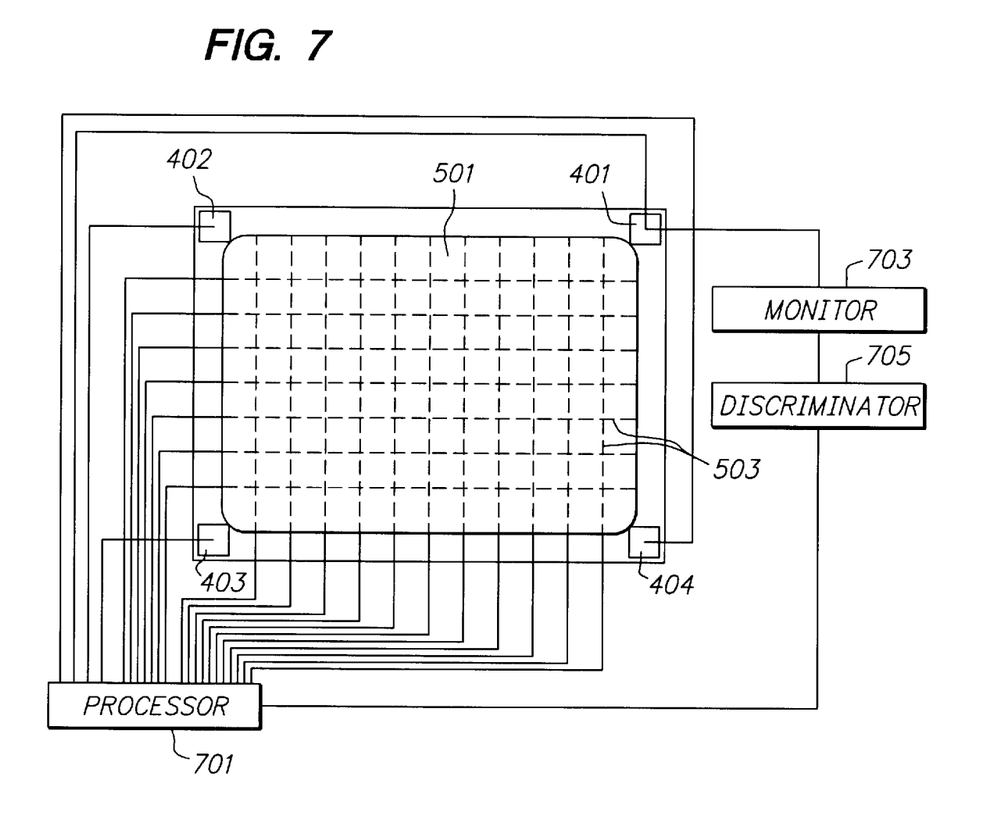
FIG. 7 is an illustration of an embodiment utilizing a projective-capacitive sensor as the primary sensor and one or more force sensors as the secondary sensor.

In the embodiment of the invention illustrated in FIG. 7, the primary sensor is a projective-capacitive sensor in which the electrode array is comprised of electrodes 503. The projective-capacitive sensor is coupled to a processor 701 that is used to determine the touch position coordinates from the output of the projective-capacitive sensor. The secondary touch sensor is a force sensor and, as shown, is comprised of force sensors 401–404. It should be understood that a single force sensor 401 could be used to provide touch validation. Therefore as shown in FIG. 7, the output of sensor 401 can either be coupled to a monitor 703 and a discriminator 705 to provide touch validation or directly coupled to processor 701 along with the outputs from force sensors 402–404 to provide secondary touch coordinate determination.

In the embodiment illustrated in FIG. 7, the force sensor is only used to determine when a finger makes contact with the touch surface. Thus the system is set-up to require that a certain pressure must be applied to screen 501 in order to register a "touch". If multiple force sensors are used, e.g., sensors 401–404, the sum of the signals from the force sensors must exceed the threshold value. Since in this embodiment the force sensors need not support drag and untouch functionality, the force sensor signals can be processed using a relatively narrow frequency filter. As a result of the narrow frequency filter, mechanical background noise, such as that caused by reference mass vibrations, is relatively easy to suppress.

Figure 8:
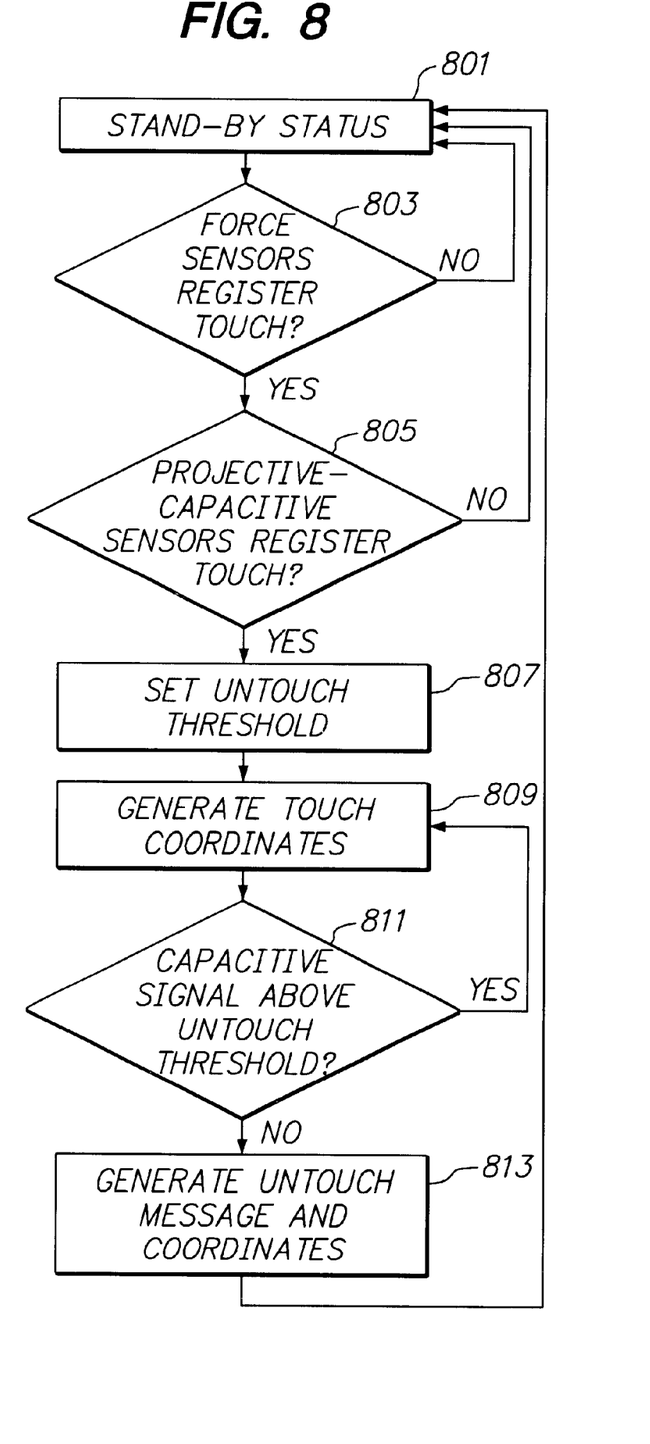
FIG. 8 is a flow chart illustrating the preferred method of using the embodiment illustrated in FIG. 7.

FIG. 8 indicates the preferred method for use with the embodiment illustrated in FIG. 7. Initially the system is in a stand-by mode while it awaits a touch (step 801). Once the force sensor(s) detects a touch by determining that the force applied to the touchscreen exceeds a preset threshold (step 803), the projective-capacitive system is queried to determine if it also detects a touch (step 805). If the projective-capacitive system does not detect a touch then the system is placed back into stand-by mode (step 801) and the touch is invalidated. If a touch is detected by the projective-capacitive system, then in the preferred embodiment of the invention an untouch threshold is set (step 807). This threshold can be, for example, equal to a percentage (e.g., 50%) of the projective-capacitive signal amplitude when the touch was first detected by the force sensor. In an alternate embodiment, a pre-set threshold is used, thus eliminating threshold a setting step 807.

The next step generates the position coordinates of the touch (step 809). In the preferred embodiment, the position coordinates are determined by the projective-capacitive system. Preferably the system continues to monitor the projective-capacitive signal, continually generating position coordinates as long as the projective-capacitive signal is above the untouch threshold (step 811). Therefore if the user employs a drag motion (i.e., dragging a finger across the screen), the system continues to generate the required touch position information. Once the projective-capacitive signal falls below the untouch threshold, the system generates an untouch message and the final position coordinates (step 813) and then returns to the stand-by mode.

There are a number of benefits to the above system. First, the use of the force sensor eliminates the possibility of the projective-capacitive system responding to a touch prior to actual touch, i.e., when the user's finger or hand is merely close to the screen but not yet touching the screen. Second, employing the threshold setting step discussed above eliminates the problems associated with fingers of varying size or capacitance (e.g., small versus large fingers, gloved versus ungloved hands, etc.). Third, since the drag and untouch capability is achieved using the projective-capacitive system, the typical difficulty in processing sub-Hertz information using a force sensor is overcome. Fourth, the problems of false touch generation due to wind or large vibrations as well as the calibration and stability issues surrounding force sensors are avoided since in this embodiment the force sensors are only used to determine touch occurrence, not accurately determine touch position.

Figure 9:
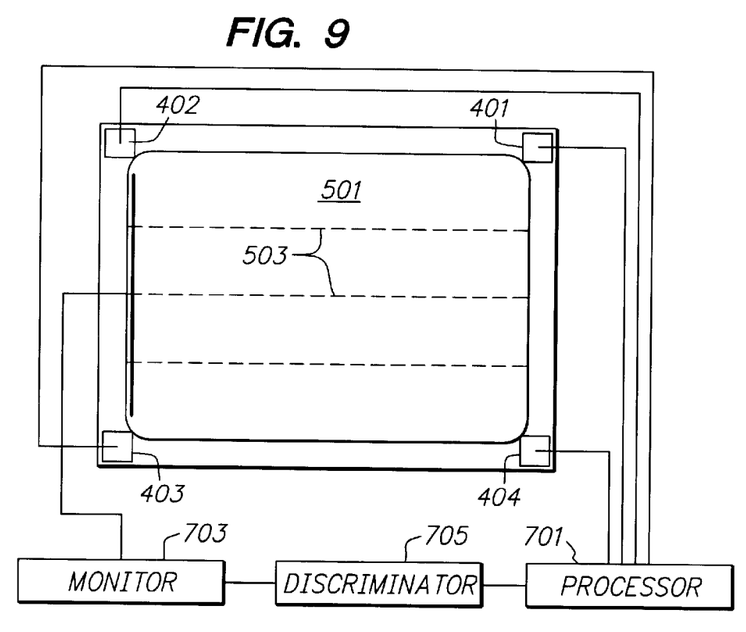
FIG. 9 is an illustration of an embodiment utilizing multiple force sensors as the primary sensor and a projective-capacitive sensor as the secondary sensor.

In a second embodiment using the combination of projective-capacitive sensors and force sensors illustrated in FIG. 9, force sensors 401–404 are used to accurately determine position while the projective-capacitive sensors are merely used to confirm that a true touch has occurred. In this system the force sensors are set up in a standard configuration in order to achieve the desired accuracy, using techniques well known by those of skill in the art. In contrast, the projective-capacitive sensors are designed to provide minimal accuracy, thus requiring few electrodes 503, possibly as few as a single electrode 503. Preferably more than one electrode is used, thus providing better sensitivity and performance. Even if more than one electrode is used, since the projective-capacitive system is ultimately not used to determine touch position, a greatly reduced number of electrodes and a correspondingly reduced number of electronic channels is required. Furthermore, since the projective-capacitive electrodes are only used for touch confirmation, both x- and y-axis electrodes are unnecessary, further reducing sensor and electronics complexity. As shown, force sensors 401–404 are directly coupled to processor 701 for determining the touch position coordinates while the output of the projective-capacitive sensor is coupled to processor 701 via monitor 703 and discriminator 705.

Figure 10:
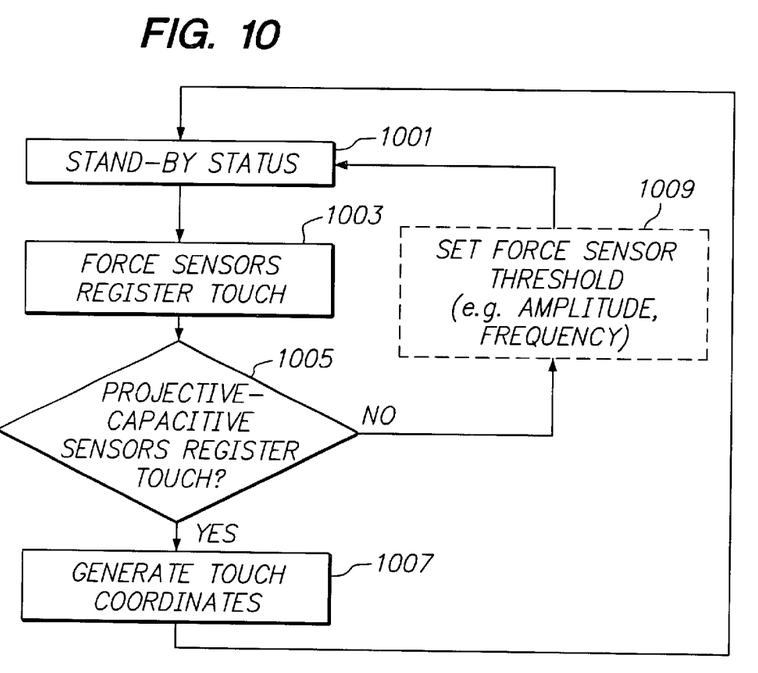
FIG. 10 is a flow chart illustrating the preferred method of using the embodiment illustrated in FIG. 9.

FIG. 10 illustrates the method of the invention in which the projective-capacitive sensor is only used as the touch confirmation sensor as discussed above in relation to FIG. 9. Initially the system is in a stand-by mode (step 1001). The first step is the detection of a touch by the force sensors (step 1003). The projective-capacitive system then determines whether or not the touch is a valid touch by determining if the touch is due to a conductive and grounded object (step 1005). If the touch is validated, touch position coordinates are generated by the force sensors (step 1007) and the system is returned to the stand-by mode. In the simplest configuration of this embodiment, if the projective-capacitive system does not confirm that a valid touch has occurred, the system is simply returned to the stand-by mode. In an alternate configuration, if the touch is invalidated, the system adjusts the threshold of the force sensors (step 1009). For example, the required force threshold can be increased, thus avoiding false touches (e.g., false touches due to wind). Preferably if the force threshold is adjusted to compensate for false touches, periodically the threshold is automatically decreased thus accounting for decreasing noise (e.g., decreasing wind noise) and providing optimal touch sensitivity. Besides setting the threshold on the force sensors' amplitude, the frequency spectrum of the background can also be monitored, thus allowing the use of suitable frequency filters as required. In this configuration, if a false touch is detected with the projective-capacitive sensors, the background frequency spectrum can be evaluated and an appropriate frequency filter applied. As in the case of the force threshold, preferably the frequency filter is periodically relaxed or the frequency spectrum is periodically remeasured, thus insuring that unnecessary filtering is not applied.

Figure 11:
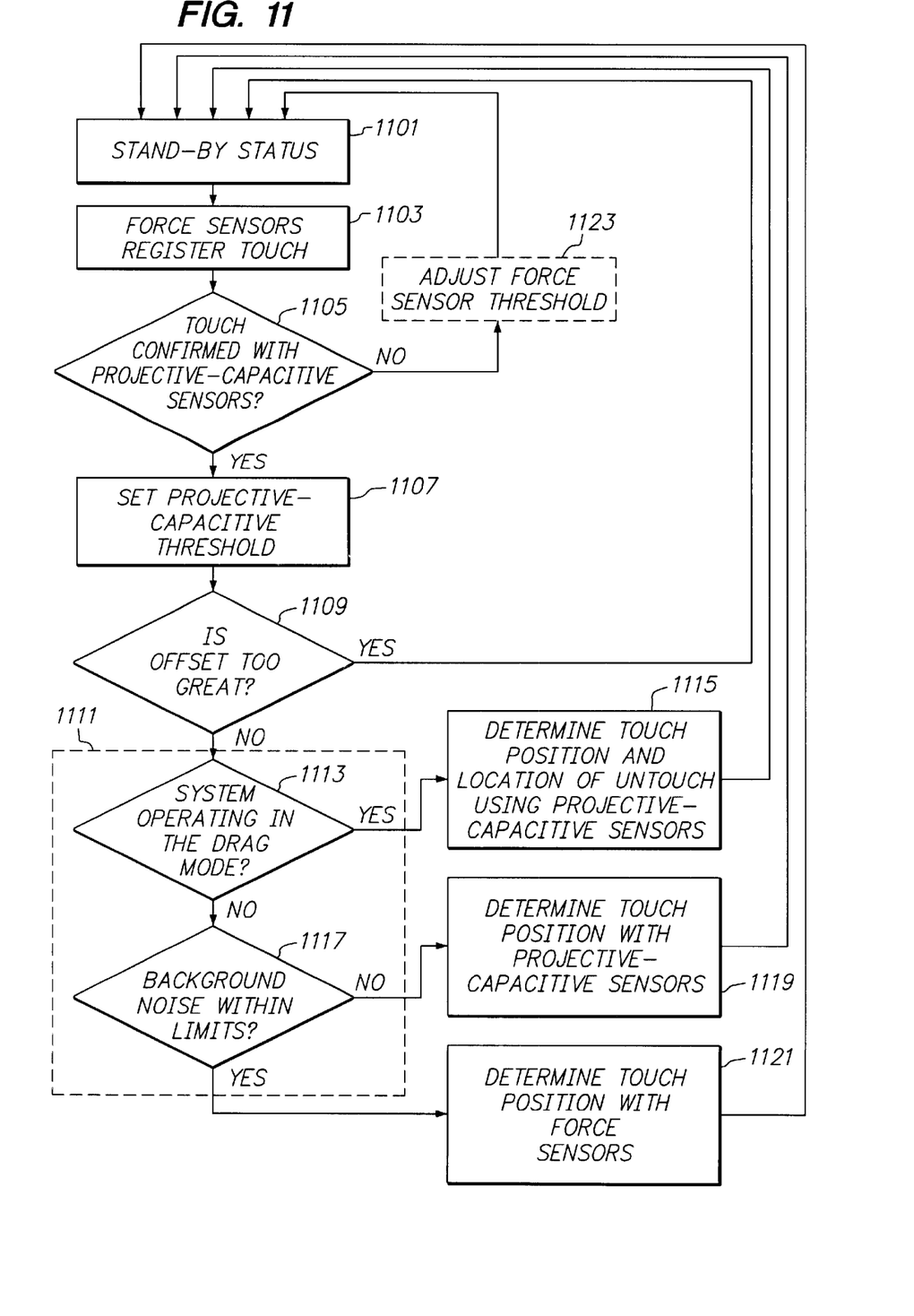
FIG. 11 is a flow chart illustrating the method used with an embodiment of the invention in which both the projective-capacitive and force touch sensors provide touch position coordinates.

In one embodiment of the invention, both the projective-capacitive and force touch sensor systems are capable of providing touch position coordinates. In this embodiment the system touch algorithm is designed to determine which sensor system is likely to provide the most accurate position for the given conditions. The system then obtains touch coordinates from the designated system. FIG. 11 illustrates the method used with this dual sensor system.

Initially the touch system is in a stand-by mode (step 1101). Preferably the initial touch is detected by the force sensors (step 1103), thus avoiding the proximity errors that can occur with the projective-capacitive sensors. Once a touch has been detected and confirmed with the secondary sensor system (i.e., the projective-capacitive sensors in the preferred embodiment) (step 1105), the touch algorithm adjusts the threshold of the projective-capacitive sensors in order to overcome differences in finger size or conductivity (step 1107). Since both sensors provide full positional accuracy, the next step is to determine the offset between the two touch positions registered by the two sensors (step 1109). If the offset is greater than is reasonable (i.e., greater than can be accounted for due to wind, hand size, etc.), the system invalidates the touch and returns to stand-by mode. If the offset between the two touch positions is within acceptable limits, the touch is verified and the process continues.

The touch algorithm next determines which touch sensor to use in determining touch coordinates (step 1111). For example, the touch algorithm can recognize that the system is being used in a drag mode by determining that the touch position is changing prior to an untouch message being sent (step 1113). In this instance, preferably the projective-capacitive system is used to determine both touch position and the location at which untouch occurs (step 1115) since this system is generally better suited for supporting the drag mode as noted above. Alternately, if the system determines that the vibrational or wind generated background noise is too great (step 1117) the touch algorithm can select the projective-capacitive system to provide touch positions (step 1119). Otherwise the force sensors can be used to determine touch position (step 1121).

In a slight modification of this embodiment, if the projective-capacitive sensors do not confirm the touch initially detected by the force sensors (step 1105), the system can adjust the force sensor thresholds (step 1123) prior to returning the system to the stand-by mode. As noted with reference to FIG. 10, either the amplitude threshold or the frequency filter for the force sensors can be adjusted.

Besides overcoming the deficiencies of both sensor systems, the combination of sensors described above has other advantages. For example, in the system stand-by mode, only one of the sensor systems needs to be in the ready state. Thus the other sensor system can be in a completely unpowered state, thereby reducing power consumption. For example, the force sensors can remain in the alert state and, once triggered, the projective-capacitive electrodes can be scanned.

Another advantage of the above combined sensors is the possibility of obtaining limited user identification. For example, a right-handed user, due to the capacitance of the user's hand, tends to project a touch position with the projective-capacitive system that is to the right of the point of contact as determined by the force sensors. Similarly, a left-handed user tends to project a touch position that is to the left of the point of contact as determined by the force sensors. Other touch attributes that can be used in an identification system are offset between the touch positions determined by the two systems, the force used to touch the screen, the speed at which the user touches multiple areas on the screen, and the time between a user's initial touch and their untouch. The system can be designed to monitor only certain touch strokes (e.g., user code for an ATM machine), or all touch strokes. One potential use of the data is to provide different users with different menus, touchscreens, etc. based on past use.

The use of multiple touch sensors typically does not require multiple sets of electronics since much of the electronics associated with a touchscreen controller is independent of the type of detector. For example, a typical touchscreen controller requires a microprocessor, RAM, ROM, an analog-to-digital converter (ADC), power supply circuitry, digital circuits to support communication with the host computer, and a printed circuit board. Thus in many cases much of the electronics associated with the touchscreen can be used to support multiple sensor systems.

In some instances, other aspects of the controller electronics may be common to two different types of sensors. For example, some types of piezoresistive force sensors can be read out with an alternating-current excitation voltage in the tens of kiloHertz range as opposed to the more typical approach of using a direct-current excitation voltage. Therefore the same excitation frequency and similar receive electronics can be used for both the force sensors and the projective-capacitive sense electrodes.

Figure 12:
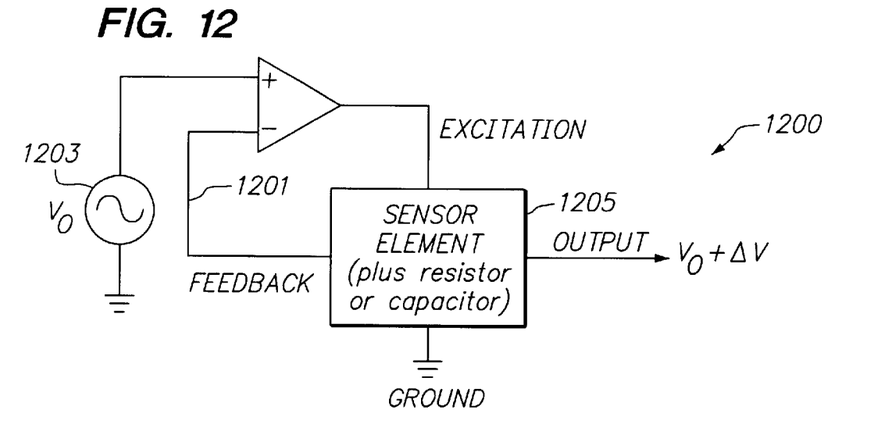
FIG. 12 is an illustration of a generic block circuit diagram for a sensor element readout circuit.

FIG. 12 is an illustration of a generic block circuit diagram for a sensor element readout circuit 1200. Negative feedback assures that the voltage on a feedback line 1201 is the same as the oscillating voltage $V_0$ produced by a reference 1203. The output from a sensor element 1205 is the signal voltage $\Delta V$ superposed on the reference voltage $V_0$. The output line plus a reference voltage line provide a differential signal output voltage $\Delta V$.

Figure 13:
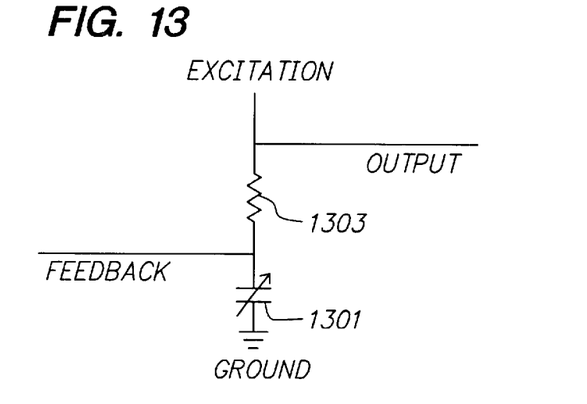
FIG. 13 is an illustration of a projective-capacitive sensor element for use with the circuit of FIG. 12.

FIG. 13 illustrates a projective-capacitive sensor element for use with the circuit of FIG. 12. A variable capacitor 1301 represents the projective-capacitive sensor electrode. In use, a user's finger or other grounded object causes the capacitance to ground to be increased. A resistor 1303 supports the readout scheme. Resistor 1303 can either be built directly into the sensor or located with the readout electrodes.

The feedback circuit illustrated in FIG. 12 can also be used with the alternating current readout of a force sensor.

Figure 14:
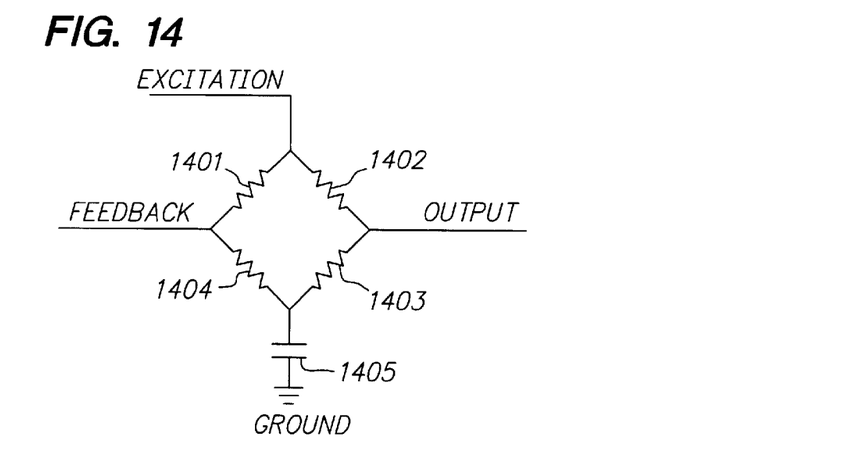
FIG. 14 is an illustration of a force sensor element for use with the circuit of FIG. 12.

Some force sensors, for example those manufactured by C-Cubed Limited, are read out via a Wheatstone bridge. Thus, as shown in FIG. 14, one or more of the four resistors 1401–1404 may correspond to piezoresistive elements in the force sensor. In the embodiment shown, the bridge is connected to ground via a capacitor 1405. Although capacitor 1405 is not required, it may useful for reducing the differences between the excitation and feedback voltages, thereby making the ratio of $\Delta V$ to $V_0$ more similar to signals from the projective-capacitive electrodes.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A touchscreen system, comprising:
    at least one force sensor coupled to a touchscreen of said touchscreen system, said force sensor monitoring a force component associated with a touch of said touchscreen;
    a projective-capacitive sensor system coupled to said touchscreen; and
    a processor coupled to said at least one force sensor and said projective-capacitive sensor system, wherein said processor calculates a set of position coordinates associated with said touch when said force component is greater than a force threshold, said set of position coordinates determined by said projective-capacitive sensor system.

2. The touchscreen system of claim 1, wherein said processor sets said force threshold.

3. The touchscreen system of claim 1, wherein said processor increases said force threshold when said projective-capacitive sensor system does not register said touch substantially simultaneously wit h said at least one force sensor.

4. The touchscreen system of claim 1, further comprising a discriminator coupled to said at least one force sensor, wherein said discriminator determines if said force component exceeds said force threshold.

5. A touchscreen system, comprising:
    a plurality of force sensors coupled to a touchscreen of said touchscreen system;
    at least on e electrode coupled to said touchscreen;
    a projective-capacitive sensor system coupled to said at least one electrode, wherein said at least one electrode is insufficient to determine a set of position coordinates associated with a touch of said touchscreen; and
    a processor coupled to said plurality of force sensors and said projective-capacitive sensor system, wherein said processor calculates said set of position coordinates when said plurality of force sensors and said projective-capacitive sensor system substantially simultaneously detect s aid touch, wherein said set of position coordinates is determined by said plurality of force sensors.

6. The touchscreen system of claim 5, wherein said at least one electrode is formed along a single axis of said touchscreen.

7. A touchscreen system, comprising:
    a plurality of force sensors coupled to a touchscreen of said touchscreen system;
    a plurality of electrodes coupled to said touchscreen, wherein a first portion of said plurality of electrodes are formed along a first axis and a second portion of said plurality of electrodes are formed along a second axis;
    a projective-capacitive sensor system coupled to said plurality of electrodes; and
    a processor coupled to said plurality of force sensors and said projective-capacitive sensor system, wherein said processor calculates said set of position coordinates when said plurality of force sensors and said projective-capacitive sensor system substantially simultaneously detect a touch of said touchscreen.

8. The touchscreen system of claim 7, wherein said first axis is substantially orthogonal to said second axis.

9. The touchscreen system of claim 7, wherein said set of position coordinates is registered by said plurality of force sensors.

10. The touchscreen system of claim 7, wherein said set of position coordinates is registered by said projective-capacitive sensor system.

11. A method of operating a touchscreen system, comprising the steps of:
    detecting a force applied to a touchscreen of said touchscreen system with at least one force sensor, wherein said detected force corresponds to a touch of said touchscreen;
    confirming said touch of said touchscreen detected by said at least one force sensor with a projective-capacitive sensor;
    generating a set of position coordinates corresponding to said touch; and
    transmitting said set of position coordinates to a touchscreen operating system.

12. The method of claim 11, further comprising the step of returning said touchscreen system to a stand-by mode if a negative response to said confirming step is received from said projective-capacitive sensor.

13. The method of claim 11, further comprising the step of setting an untouch threshold for said projective-capacitive sensor.

14. The method of claim 13, wherein said untouch threshold is a percentage of an initial projective-capacitive signal amplitude determined when said touch was first detected by said force sensor.

15. The method of claim 13, further comprising the step of comparing a projective-capacitive signal amplitude corresponding to said touch to said untouch threshold, wherein said set of position coordinates corresponds to a second touch location associated with said projective-capacitive signal amplitude falling below said untouch threshold.

16. The method of claim 13, further comprising the steps of comparing a projective-capacitive signal amplitude corresponding to said touch to said untouch threshold, and generating a second set of position coordinates corresponding to a second touch location associated with said projective-capacitive signal amplitude falling below said untouch threshold.

17. The method of claim 15, further comprising the steps of generating an untouch message when said projective-capacitive signal amplitude falls below said untouch threshold and transmitting said untouch message to said touchscreen operating system.

18. The method of claim 11, wherein said set of position coordinates is generated by said at least one force sensor.

19. The method of claim 11, wherein said set of position coordinates is generated by said projective-capacitive sensor.

20. The method of claim 11, further comprising the step of setting a force sensor threshold if a negative response to said confirming step is received from said projective-capacitive sensor.

21. The method of claim 20, wherein said force sensor threshold is a force amplitude.

22. The method of claim 20, wherein said force sensor threshold is a frequency spectrum.

23. The method of claim 20, wherein said force sensor threshold setting step comprises applying a frequency filter to said detected force.

24. The method of claim 11, further comprising the steps of:

comparing a first touch position determined by said at least one force sensor with a second touch position determined by said projective-capacitive sensor; and returning said touchscreen system to a stand-by mode if an offset between said first and second touch positions is greater than a predetermined offset threshold.

25. The method of claim 11, further comprising the steps of:

determining a background mechanical noise level; and comparing said background mechanical noise level with a noise threshold, wherein said set of position coordinates is generated by said at least one force sensor if said background mechanical noise level is less than said noise threshold, and wherein said set of position coordinates is generated by said projective-capacitive sensor if said background mechanical noise level is greater than said noise threshold.

26. The method of claim 11, further comprising the step of determining if said touchscreen system is operating in a drag mode, wherein said set of position coordinates is generated by said at least one force sensor if said touchscreen system is not operating in said drag mode, and wherein said set of position coordinates is generated by said projective-capacitive sensor if said touchscreen system is operating in said drag mode.

* * * * *